Figure 1A:
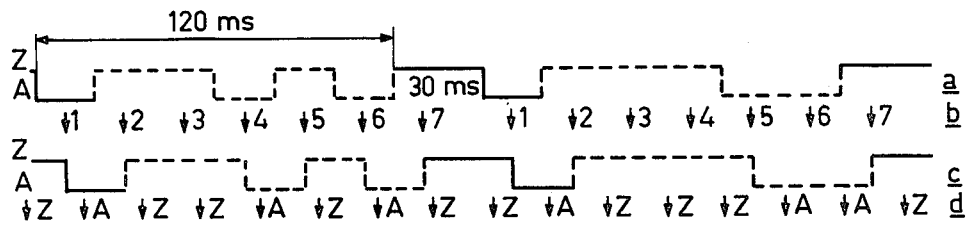

United States Patent [19]

Bodart et al.

[11] 4,374,305
[45] Feb. 15, 1983

[54] ARRANGEMENT FOR REGENERATING START-STOP SIGNALS AND DIAL PULSES

[75] Inventors: Robert Bodart; Jean-Pierre Werts, both of Brussels, Belgium

[73] Assignee: U.S. Philips Corporation, New York, N.Y.

[21] Appl. No.: 191,098

[22] Filed: Sep. 26, 1980

Related U.S. Application Data

[63] Continuation of Ser. No. 38,759, May 14, 1979, abandoned, which is a continuation of Ser. No. 834,241, Sep. 19, 1977, abandoned.

[30] Foreign Application Priority Data

Nov. 8, 1976 [NL] Netherlands ................... 7612357

[51] Int. Cl.³ ............... H04L 25/52; H04L 25/64; H04Q 1/36
[52] U.S. Cl. ................... 179/16 EA; 178/70 R; 370/48
[58] Field of Search ............. 178/70 R, 70 TS; 179/16 E, 16 EA; 328/164; 375/4; 370/48, 97

[56] References Cited

U.S. PATENT DOCUMENTS

| 2,822,422 | 2/1958 | Terry et al. | 370/48 |
| 3,355,549 | 11/1967 | Alexander et al. | 370/97 |
| 3,383,465 | 5/1968 | Wilson | 328/164 |
| 3,396,239 | 8/1968 | Yamauchi | 178/70 R |
| 3,475,556 | 10/1969 | Sasaki et al. | 178/70 R |
| 3,626,095 | 12/1971 | Nakagome et al. | 178/70 R |

FOREIGN PATENT DOCUMENTS 2321469 11/1974 Fed. Rep. of Germany.

Primary Examiner—G. Z. Rubinson
Assistant Examiner—Randall P. Myers
Attorney, Agent, or Firm—Thomas A. Briody; William J. Streeter; Edward W. Goodman

[57] ABSTRACT

Described is the regeneration of dial pulses in the signalling system CCITT type B. The dial pulses are regenerated by a combined regeneration process comprising a reduced process with two sampling instants (10 ms, 30 ms) and an inverse process with four (anisochronous) sampling instants (10 ms, 30 ms, 52 ms, 72 ms). The reduced process is started by the stop-start transition at the beginning of the first of a series of dial pulses and the inverse process by the start-stop transition which occurs at the end of the series of dial pulses.

4 Claims, 7 Drawing Figures

ARRANGEMENT FOR REGENERATING START-STOP SIGNALS AND DIAL PULSES

This is a continuation of application Ser. No. 038,759, filed May 14, 1979, now abandoned, which is a continuation of application Ser. No. 834,241, filed Sept. 19, 1977 (now abandoned).

(A) BACKGROUND OF THE INVENTION (1) Field of the Invention

The invention relates to an arrangement for regenerating start-stop signals and dial pulses and converting the regenerated signals into an isochronous signal in which the start-stop signals are regenerated by means of a regeneration process having a sampling instants initiated by a stop-start transition and in which the dial pulses are regenerated by a combined regeneration process comprising two mutually exclusive regeneration processes which are initiable by the signal transitions in opposite directions and in which the signal samples taken at the sampling instants are stored in an elastic storage device (commonly referred to as a buffer memory) which is read at isochronous timing instants for forming an isochronous information signal.

The invention comes from the field of time-multiplex systems for telegraphy with bit interleaving, in particular such systems in which one element of the telegraph signal is represented by one bit in the isochronous signal.

The asynchronous regeneration process which is used in the multiplexer is based on sampling the successive elements of each character. This process is synchronized by the stop-start transition at the beginning of each character such that each element is sampled in its center.

The telex signals which are transmitted in accordance with the signalling system type B of the CCITT do not have the form of characters and render special measures necessary for their regeneration.

(2) Description of the Prior Art

German Auslegeschrift No. 2,321,469 (reference D 1) and the CCITT document Study Group IX-Contribution No. 12 of January 1974 (reference D 2) disclose a method for regenerating dial impulses.

This known method comprises:

a normal process with seven sampling instants which is initiated by the stop-start transition at the beginning of each series of dial pulses (10, 30, 50, 70, 90, 110, 130 ms)

a modified process with four sampling instants which is initiated by the start-stop transition which occurs at each following pulse of the same series (10, 30, 50, 70 ms)

In accordance with the CCITT recommendation U 2 (reference D3) the characteristics of the dial pulses may vary between the limits indicated here below:

rate: 9–11 pulses/sec.
pulse rate: TA/TZ = 1.2–1.9

If dial pulses having these characteristics are regenerated in a manner indicated in references D1 and D2 and the regenerated signal is converted into an isochronous signal and the plurality of successive identical bits are taken into account (A: start polarity; Z: stop polarity), then the result is:

during a normal process:
2, 3, 4 or 5 bits A
1, 2 or 3 bits Z during a modified process:
2, 3 or 4 bits A
2 or 3 bits Z.

The dial pulses are restituted from the isochronous signal at the receiving side. In accordance with reference D2 they must remain within the limits of CCITT recommendation U 24 (reference D4), that is to say:

TA: 44–98 ms (pulse duration)
TZ: 32–73 ms (pulse interval)

To this end reference D2 provides a prolongation to 50 ms of the intervals with polarity A which only comprise two bits A transmitted during a modified process.

In accordance with reference D2, however, it is not avoided that at the beginning of a series of dial pulses, intervals having the polarity A of 40 ms and 100 ms and an interval having the polarity Z of 20 ms may be produced.

In the CCITT recommendation R 101 (reference D 5) which relates to telegraph multiplexers of the present type the tolerances of reference D 4 are not taken over. In reference D 5 it is suggested to restitute the dial pulses within the narrower limits of reference D 3, that is to say:

TA: 49.6–72.8 ms
TZ: 31.4–50.5 ms

(B) SUMMARY OF THE INVENTION

It is an object of the invention to reduce the variations in the plurality of successive bits A and successive bits Z in the isochronous signal when dial pulses are transmitted, in view of a simple restitution at the receiving side.

The arrangement according to the invention is characterized in that the combined regeneration process comprises a reduced regeneration process with two sampling instants which is initiated by a stop-start transition and an inverse regeneration process with four sampling instants which is initiated by a start-stop transition.

A reduced process having the sampling instants 10, 30 ms and an inverse process with the sampling instants 10, 30, 50, 70 ms ensure that 5 bits A and one bit Z cannot occur. By a change in the sampling instants of the inverse process whereby this becomes an anisochronous process with the sampling instants 10, 30, 52, 72 ms, the occurrence of three bits Z is avoided.

In accordance with the invention the isochronous signal comprises:

2, 3 or 4 bits A
2 bits Z so that at the receiver side, dial pulses can be restituted which only have a low "jitter" in their characteristics.

At the receiver side dial pulses within the limits of reference D 3 can be restituted from the isochronous signal by converting the 2 bits Z into an interval of 41 ms, by converting the 2 bits A into a prolonged interval of 50 ms and by converting the 4 bits A into a shortened interval of 70 ms. In this manner all variations of the dial pulses are offset by a variation in the intervals with polarity A.

It should be noted that the dial pulses which are restituted in this manner at the receiver side are within narrower limits than indicated by reference D 3. This is advantageous when a further arrangement is connected to the receiver side in which no further provisions for signal regeneration have been applied, for example a tone system.

(C) SHORT DESCRIPTION OF THE FIGURES

FIG. 1 time diagrams for illustrating the regeneration processes.

Figure 2:
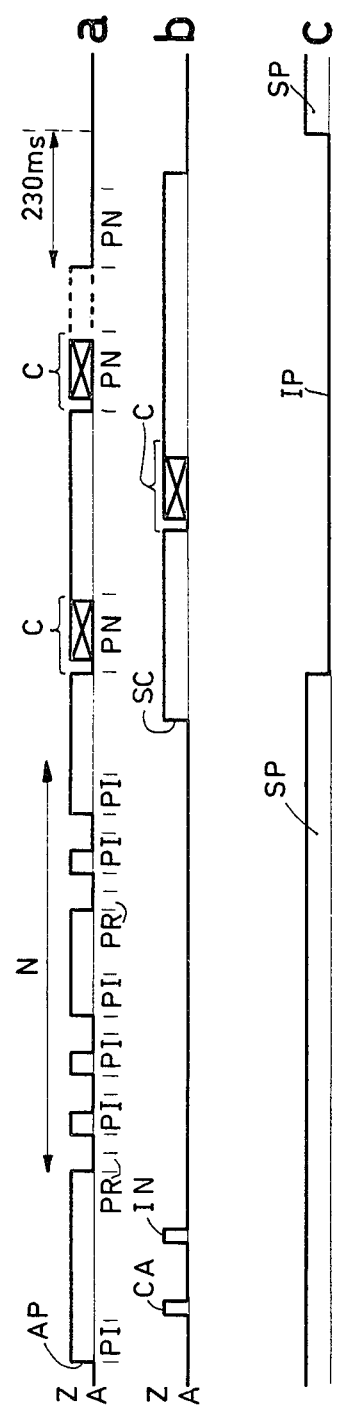
Figure 3:
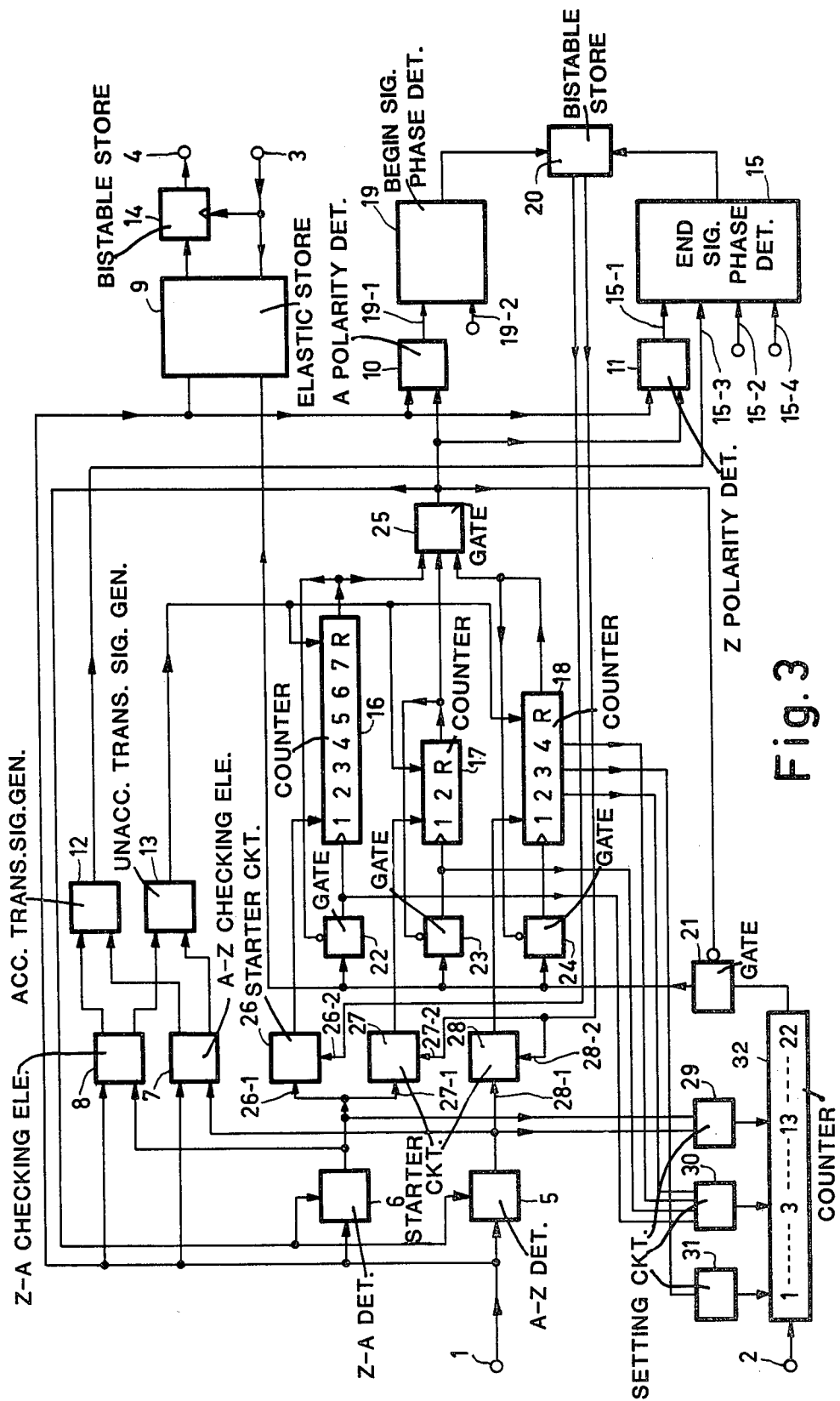

FIG. 2 time diagrams for illustrating the signalling phase and information phase; and FIG. 3 block diagrams of an arrangement according to the invention.

(D) REFERENCES

D 1 German Auslegeschrift No. 2321469
D 2 CCITT, Study Group IX-Contribution No. 12 January 1974
D 3 CCITT Recommendation U 2
D 4 CCITT Recommendation U 24
D 5 CCITT Recommendation R 101

(E) DESCRIPTION OF THE OPERATION OF THE REGENERATION PROCESSES

The operation is illustrated with reference to the FIGS. 1A to 1E.

Each Figure comprises four lines a, b, c and d.
Line a shows an input signal.
Line b shows the sampling instants.

For the normal process they are numbered 1, 2, 3, 4, 5, 6, 7 (10, 30, 50, 70, 90, 110, 130 ms). For the reduced process they are numbered 1, 2 (10, 30 ms) and for the inverse process they are numbered 1, 2, 3, 4 (10, 30, 52, 72 ms).

Line c shows the regenerated signal which is obtained by having the signal samples taken at the sampling instants adjust a bistable memory to one or the other stable state in accordance with the polarity A or Z of the signal sample.

In line d the isochronous signal is shown which is obtained when the regenerated signal is entered into an elastic storage device which is read out at isochronous instants. In accordance with reference D 5 the isochronous signal has a rate of (48/47)·50 bit/sec. (one bit every 19 7/12 ms).

FIG. 1A relates to a 50 Baud telegraph signal having characters of 7½ units (6 elements of 20 ms and a stop element of 30 ms). These characters are regenerated with the normal regeneration process with seven sampling instants.

Figure 1B:
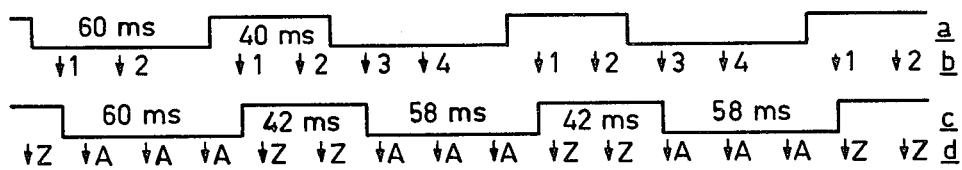

FIG. 1B relates to a dial pulse having the nominal rate of 10 pulses/sec and the nominal pulse ratio of 1.5. Here the reduced and the inverse regeneration process are applicable. These dial pulses supply 2 bits Z and 3 bits A in the isochronous signal.

Figure 1C:
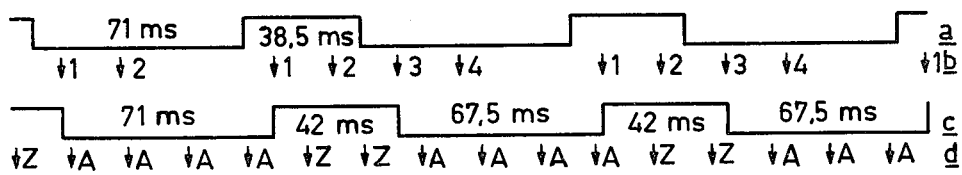

FIG. 1C relates to dial pulses having a rate of approximately 9 pulses/sec and a pulse ratio of approximately 1.8.

Figure 1D:
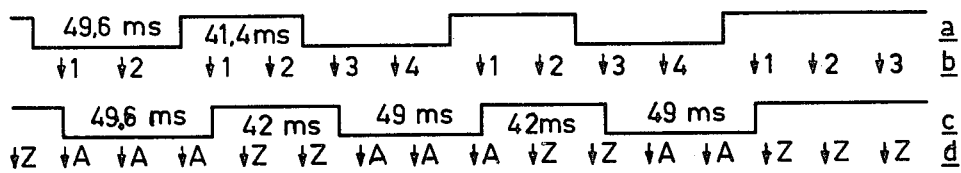

FIG. 1D relates to dial pulses having a rate of 11 pulses/sec and a pulse ratio of 1.2.

Figure 1E:
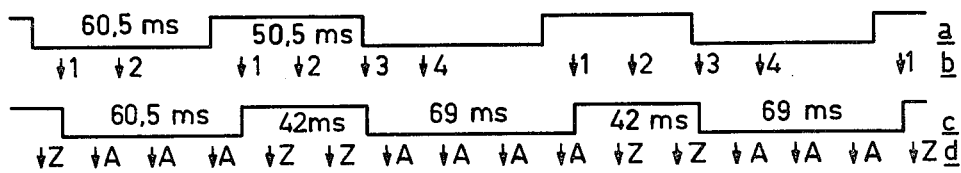

FIG. 1E illustrates the case of dial pulses having a rate of 9 pulses/sec and a pulse ratio 1.2.

In the case of FIG. 1D the isochronous signal comprises 2 bits A and 3 bits A and in the case of FIG. 1E 3 bits A and 4 bits A.

The example of FIG. 1C is chosen in view of the fact that when applying the known method in accordance with reference D1 and D2 to dial pulses having these characteristics, the unwanted case may occur that the isochronous signal comprises 5 bits A and one bit Z.

The examples given illustrate that which Applicants have verified for all dial pulses which fall within the tolerances of reference D3, that the isochronous signal always comprises two successive bits Z (no more and no less) and two, three or four successive bits A.

During the transmission of telegraph characters, that is to say during the information phase, the telegraph signal is regenerated by means of the normal regeneration process.

The dial pulses are transmitted in the signalling phase, the beginning and the end whereof can be detected in an unambiguous manner. This is used as criterion for switching on the regeneration process for the dial pulses.

(F) DESCRIPTION OF FIG. 2

In line a of FIG. 2 the moment at which a call occurs is indicated by the transition from start-to-stop polarity which is indicated by AP. From the inverse direction, the signals of which are shown in line b, a call confirmation arrives thereafter in the form of a pulse which is indicated by CA and thereafter a proceed-to-select in the form of a pulse which is indicated by IN.

After the call, in the forward direction, there now follows a period N in which dial pulses are transmitted. Thereafter a cell-connected signal arrives from the inverse direction in the form of constant stop polarity which starts at the start-stop transition indicated by SC.

Hereafter a period starts in which telegraph characters C are transmitted in both directions.

The connection is interrupted by transmitting constant start polarity for at least 230 ms.

The signalling described above is in conformity with the signalling system CCITT type B.

The beginning of the signalling phase is at the occurrence of a start polarity having a duration longer than 230 ms.

The signalling phase ends at the occurrence of a stop-start transition in one signal direction while a constant stop polarity is transmitted in the other direction.

In line c of FIG. 2 the signalling phases are indicated by SP and the information phase by IP.

Line a also shows which of the regeneration processes are applicable, wherein PN indicates the normal process, PI the inverse process and PR the reduced process.

It should be noted that the arrangement according to the invention is also capable of regenerating the pulses CA and IN (FIG. 2, line a). These pulses have a duration of 17.5–35.5 ms and are regenerated by means of the inverse process. In the isochronous signal these pulses supply one bit Z or two bits Z.

(G) DESCRIPTION OF AN EXAMPLE OF AN ARRANGEMENT ACCORDING TO THE INVENTION (FIG. 3)

The arrangement according to the invention (transmitter) comprises an input terminal 1 for receiving telex signals, an input terminal 2 for receiving a clock signal (1 kHz), an input terminal 3 for receiving a clock signal from the multiplexer (48/47·50 Hz) and an output terminal 4 for transmitting an isochronous signal which comprises a new bit every 19 7/12 ms.

The signal from input terminal 1 is applied to a detector 5 for A-Z transitions, a detector 6 for Z-A transitions, a checking element 7 for the A-Z transitions, a checking element 8 for the Z-A transitions, an elastic storage device (or buffer memory) 9, a detector 10 for the quiescent state with A-polarity and a detector 11 for the quiescent state with Z-polarity.

An arrangement 12 which is connected to the checking elements 7 and 8 supplies a signal when a transition is accepted. A device 13 supplies a signal if a transition is not accepted. A checking element 7 or 8 does not accept a transition from one polarity to the other polarity if this other polarity is not confirmed after 10 ms.

The signal of device 12 is supplied to a device 15 for detecting the end of the signalling phase.

The signal of device 13 is applied to three counters 16, 17, 18 which serve for counting the scanning moments of the various regeneration processes and adjusts them to the quiescent state.

A device 19 for detecting the beginning of the signalling phase receives at input 19-1 the output signal of detector 10 and at input 19-2 a signal indicating the presence of constant A-polarity in the signal being transmitted in the inverse direction (see FIG. 2b), back to the transmitter, which signal is detected by a local receiver (not shown), provided in the transmitter, having a detector similar to detector 10.

The device 19 supplies a signal after constant A-polarity with a duration of at least 230 ms is transmitted in the one or the other signal direction. This signal is stored in a bistable storage device 20.

At input 15-1 the device 15 receives the output signal of detector 11 and at input 15-2 a signal from a detector (not shown), similar to detector 11, in the local receiver. At input 15-3 the device 15 receives the output signal from device 12 and at input 15-4 a signal from a device (not shown), similar to device 12, in the local receiver.

The device 15 supplies a signal when in one signal direction a Z-A-transition occurs whilst in the other signal direction constant Z-polarity is transmitted. This signal is stored in the bistable storage device 20 wherein then the signal of device 19 is erased.

The clock pulses of input terminal 2 are applied to a counter 32 which supplies scanning pulses to a gate 21. If no regeneration process is in operation then gate 21 does not pass scanning pulses to the gates 22, 23, 24 which are added to the counters 16, 17, 18.

Gate 21 is controlled by an AND-circuit 25. The latter receives a signal from each of the counters 16, 17, 18 when they are idle and then blocks gate 21. At the same time AND-circuit 25 activates the detectors 5, 6 and 10, 11.

The gates 22, 23, 24 receive a signal from the associated counter when the latter is in the quiescent state and then do not pass scanning pulses.

The starter circuits 26, 27, 28 are added to the counters 16, 17, 18.

An input 26-1 starter circuit 26 receives the output signal from detector 6 and at input 26-2 a signal from the storage device 20 if the information phase is in operation. If, in this phase, detector 6 detects a Z-A-transition then starter circuit 26 adjusts counter 16 to the counting position no. 1.

At input 27-1 starter circuit 27 receives the output signal from detector 6 and at input 27-2 a signal from the storage device 20 if the signalling phase is in operation. If, in this phase, detector 6 detects a Z-A-transition then starter circuit 27 adjusts the counter 17 to counting position no. 1.

At input 28-1 starter circuit 28 receives the output signal of detector 5 and at input 28-2 the same signal as input 27-2 of starter circuit 27. So, if in the signalling phase an A-Z-transition is detected then starter circuit 28 adjusts the counter 18 to the counting position no. 1.

Counter 32 has 22 counting positions. Three setting circuits 29, 30, 31 are added to counter 32.

Setting circuit 25 receives the output signals from the transition detectors 5 and 6 and as a consequence thereof adjusts counter 32 to the counting position number 13. The first scanning pulse of counter 32 then occurs after 10 clock pulses (10 ms) after detector 5 or 6 has detected a transition for the first time.

Setting circuit 30 receives the output signals from the gates 22, 23 and the decoded output signals from the counting positions number 2 and number 4 of counter 18 and consequently adjusts counter 32 to counter position number 3. The subsequent scanning pulse then occurs after 20 clock pulses (20 ms).

Setting circuit 31 receives the decoded output signal of counting position number 3 from counter 18 and as a result thereof adjusts counter 32 to counting position number 1. The subsequent scanning pulse then occurs after 22 clock pulses (22 ms).

A counter (16) which has been brought out of the quiescent state by the associated starter circuit (26) removes the signal from the associated gate (22) which causes the latter to become conducting. In addition, the signal is removed from AND-circuit 25 which causes gate 21 to become conducting. Now the relevant counter counts the scanning pulses which occur at the output of gate 21.

Counter 16 is started when the normal generation process must be performed and has consequently 7 counting positions.

Counter 17 is started for the shortened process and has two counting positions.

Counter 18 is started for the inverse process and has 4 counting positions.

The scanning pulses from gate 21 are applied to the elastic storage device (or buffer memory) 9 and control there the entering of a corresponding signal sample of the signal from input terminal 1.

The elastic storage device 9 is read under the control of the clock pulse of input terminal 3. Simultaneously the read-out signal is taken over under the control of the clock pulses by the (bistable) storage device 14 which applies on isochronous information signal to the output terminal 4.

What is claimed is:

1. A method for regenerating start-stop signals and dial pulses and converting the regenerated signals into an isochronous signal, said method comprising regenerating the start-stop signals by means of a regeneration process with n sampling instants initiated by a stop-start transition, regenerating the dial pulses by a combined regeneration process comprising two mutually exclusive regeneration processes which are initiable by signal transitions in opposite directions, storing the signal samples taken at the sampling instants in an elastic storage device, and reading said storage device at isochronous timing instants for forming an isochronous information signal, characterized in that the combined regeneration process comprises regenerating said dial pulses in reduced form with two sampling instants initiated by a stop-start transition, and inversely regenerating said dial pulses with four sampling instants initiated by a start-stop transition.

2. A method as claimed in claim 1, characterized in that the time intervals between each time two sampling instants of the inverse regeneration are not all identical.

3. An arrangement for regenerating start-stop signals and dial pulses and for converting the regenerated signals into an isochronous signal, said arrangement comprising means for regenerating the start-stop signals with n sampling instants initiated by a stop-start transition, means for regenerating the dial pulses including a combined regeneration means comprising two mutually exclusive regeneration means which are initable by signal transitions in opposite directions, and means for storing the signal samples taken at the sampling instants including an elastic storage device and means for reading said storage device at isochronous timing instants and for forming an isochronous information signal, the combined regeneration means comprising reduced regeneration means with two sampling instants which is initiated by a stop-start transition and an inverse regeneration means with four sampling instants which is initiated by a start-stop transition.

4. An arrangement as claimed in claim 3, wherein the time intervals between each time two sampling instants of the inverse regeneration process are not all identical.

* * * * *